United States Patent [19]

Hao et al.

[11] 4,327,003

[45] Apr. 27, 1982

[54] POLYMERIZATION PROCESS FOR THE PRODUCTION OF PVC LATEX AND PASTE RESIN

[75] Inventors: Paul L. C. Hao; W. W. Hsu; W. S. Lin; S. N. Tong; H. K. Hung; M. C. Chang, all of Hsinchu, Taiwan

[73] Assignee: Industrial Technology Research Institute, Hsinchu, Taiwan

[21] Appl. No.: 168,765

[22] Filed: Jul. 11, 1980

Related U.S. Application Data

[63] Continuation of Ser. No. 856,602, Dec. 1, 1977, abandoned, Continuation-in-part of Ser. No. 689,743, May 25, 1976, abandoned.

[30] Foreign Application Priority Data

Aug. 30, 1975 [TW] Taiwan ............................... 64-11795
Sep. 13, 1975 [TW] Taiwan ............................... 64-11902
Jul. 2, 1976 [JP] Japan ................................. 51/77932

[51] Int. Cl.$^3$ ............................ C08F 2/24; C08F 2/32
[52] U.S. Cl. .................................... 523/336; 524/834; 524/777; 526/216; 526/909
[58] Field of Search .................... 260/29.6 SQ, 29.6 Z, 260/29.6 MQ, 29.6 R, 29.6 WQ; 526/216

[56] References Cited

U.S. PATENT DOCUMENTS 3,370,028  2/1968  De Wald ............................ 260/29.6
3,668,165  6/1972  Bergmeister ...................... 526/344.2
3,706,722  12/1972  Nelson ............................. 526/344.2

OTHER PUBLICATIONS

Sarvetnick, H. A., Polyvinylchloride, Reinhold (N.Y.) 1969, pp. 43, 44.

Primary Examiner—C. A. Henderson

[57] ABSTRACT

This invention provides a new one step polymerization process suitable for preparing latex and paste resins of PVC polymer or its copolymers. At the beginning of polymerization, a small amount of water (less than 1 part per 4 parts by weight of monomer) having a water-soluble initiator dissolved in it is suspended in a large amount of vinyl chloride monomer and comonomer so as to initiate the reaction. As the reaction proceeds the remaining initiator solution and an emulsifier solution are added continuously or batchwise over an extended period. At the end of the polymerization, a stable latex is obtained having polymer particles about one micron or greater in diameter.

8 Claims, No Drawings

POLYMERIZATION PROCESS FOR THE PRODUCTION OF PVC LATEX AND PASTE RESIN

RELATED APPLICATIONS

The present application is a continuation of U.S. Ser. No. 856,602 filed Dec. 1, 1977, which in turn is a continuation-in-part of U.S. Ser. No. 689,743, filed May 25, 1976. Both the aforesaid cases were filed for the present inventors and are now abandoned.

PRIOR ART

The present invention provides a new polymerization process suitable for the production of latex and paste resin of PVC polymer and its copolymers. The term "PVC" denotes polyvinyl chloride.

Emulsion processes are now generally used for the manufacture of latex and paste resins. In order to remove the heat of polymerization in the emulsion process so as to enable ready control of the reaction temperature and to thereby obtain a product of uniform properties, the ratio of monomer to water generally used is limited to be in the range of 30/70 to 60/40 parts by weight. The emulsion polymerization of vinyl chloride does not follow the general principle of emulsion polymerization since monomers like vinyl chloride are only slightly soluble in water and its polymer is not soluble in the vinyl chloride monomer.

It is accordingly difficult to control the proper particle size, as well as the particle number, of the resulting polymer in the emulsion polymerization processes generally employed for polymerizing vinyl chloride. In such prior art processes, the particle size is rather small and lies in the range between 0.01 to 0.1 microns diameter.

Several methods have been suggested for controlling the size and number of particles for this reaction system, such as reducing the amount of emulsifier, and/or the seeding technique. In the seeding technique, a constant number of polymer particle is maintained in the reaction system. However, the results usually are not as good as desired. Additionally, this technique is time consuming and it is difficult to prepare the seed latex. In both such prior art processes, the amount of vinyl chloride dissolved in the water phase cannot be minimized and the ability to control particle size and number is poor. Therefore, the processes generally used cannot be considered to be satisfactory.

SUMMARY OF PRESENT INVENTION

In contrast, the present process yields a latex or paste resin having a polymer particle size of about 1 micron in diameter and normally in the range of 0.8 to 2 microns. This new process not only eliminates the necessity for seed latex, but also provides for simplified operation of the reaction.

It is simple in operation and highly efficient in the control of particle size and number when making a latex from vinyl chloride.

As an alternative embodiment, the present process may be combined with seeded polymerization. The control of particle size and number is further improved and much better results obtained than the prior art emulsion polymerization processes.

Compared to the prior art, the present process uses only a small amount of water, suspended in a large amount of the monomer at the beginning of polymerization. In other words, the amount of monomer dissolved in the water is well controlled, as are consequently the particle size and number of the polymer particles. The total quantity of the monomer is added at the beginning of the polymerization. For example if the initial ratio of monomer to water is greater than 4, the resulting latex will be a polymer with a particle size of about 1 micron in diameter. The present process is accordingly simple yet more effective in producing large size polyvinyl chloride particles.

Briefly describing the present process, after the air is purged from the reactor, a small amount of water having the initiator dissolved therein and buffering agent (ammonia water) are added to the reactor. The total vinyl chloride monomer is then charged into the reactor and the polymerization is performed at a temperature standard for vinyl chloride polymerization, such as 30° to 70° C., preferably 45° to 55° C. During the initial stages of polymerization, water is kept to a minimum, e.g. less than 1 part per 3 parts of monomer, preferably less than 1 part per 4 parts of monomer. During the course of the reaction, a sufficient amount of aqueous emulsifier solution is added continuously or batchwise over an extended period to prevent coalescence of the polymer particles formed. This causes a change from a water-in-oil phase to an oil-in-water condition. The reaction is stopped as the pressure of the reaction system is dropped, e.g. to about 3 Kg/cm². The unreacted monomer is vented off and a polymer latex is obtained. It can be used directly in this form, or further processed to isolate the paste resin. The PVC particles are of large size, e.g. 0.8 to 1 microns or greater in diameter, normally about 1 micron.

The differences between the emulsion polymerization process generally employed and the present invention can be observed by performing the reaction in a glass autoclave.

In accordance with the present invention, at the beginning of the reaction a small amount of water is suspended in a large amount of vinyl chloride monomer at a given temperature and in the presence of water-soluble initiator such as persulfate or redox system initiator. Soon, the polymer particles start to appear in the water droplets. With the gradual addition of the aqueous emulsifier solution, the water phase grows larger and larger. At a certain stage of the process, the earlier phenomenom of water-in-oil turns into an oil-in-water phase. After this stage, the reaction proceeds as in conventional emulsion processes.

In the present process only a small amount of water is present in a large amount of monomer during the initial stage of polymerization. Thus, the conversion rate is low and the removal of the heat of polymerization is quite easy. When the conversion rate increases, the emulsifier solution is added over an extended period to ensure the stability of the latex formed and to prevent coagulation of the polymer particles in the reaction system. The present process further eliminates the cumbersome addition of vinyl chloride monomer. The initiation solution containing water is gradually added to the reaction system to control the proper reaction rate.

Emulsifiers generally used in emulsion polymerization, such as anionic, nonionic, or mixtures of both, can be used in the present process. Similarly, conventional PVC water soluble initiators such as ammonium persulfate are used.

When the latex is dried by suitable conventional methods, such as spray drying, freezing, salting out, or drying with PH value adjusted, the PVC paste resin obtained possesses excellent properties. The conventional emulsifiers, and comonomers described in U.K. patent 698,359 may be employed and such disclosure is incorporated by reference.

The following table illustrates the distinctive nature of the present process.

TABLE 1

| Process | (By Weight) Monomer/Water | Polymer Particle, Size Microns |
|---|---|---|
| Conventional Emulsion Polymerization Process | 30/70 to 60/40 | 0.05 to 0.25 |
| Present Process | Greater than 3/1, preferably greater than 4/1 for initial stage | 0.8 to 1 or greater |

Other than the microsuspension polymerization process disclosed in British Pat. No. 698,359 which uses oil soluble initiators, none of the emulsion polymerization methods generally employed is able to control the resulting polymer particles to about 1.0 microns in diameter as does the present process which uses a water-soluble initiator in a one-step operation. None of the prior art processes uses a one-step process employing water-soluble initiators.

In the usual seeded polymerization, it is necessary to prepare the seed latex ahead of time and then use it as growing site as the reaction proceeds. Some kind of emulsifier solution is added to prevent new particle formation. If the present process is combined with the seeding technique, polymer particles with diameter of 2 or 3 microns or larger can be produced without any difficulty, and the number of particles can also be controlled more effectively.

SPECIFIC EMBODIMENTS

The various aspects of the present invention will be made more clearly apparent by reference to the following examples.

EXAMPLE 1

2.5 ml of 28% ammonia-water and 0.05 g of ammonium persulfate were dissolved in 5 ml distilled water. The solution was then suspended in 200 g vinyl chloride monomer. The ratio of monomer to water at the beginning of the polymerization was 29. The polymerization temperature was 50° C. During polymerization, the initiator solution (0.27 g ammonium persulfate in 30 ml H₂O) and emulsifier solution (ammonium salt of 1.2 g lauric acid in 300 ml H₂O) were added as shown in the following schedule:

| Time After Initiation, min. | Emulsifier Solution (ml) added | Initiator Solution (ml) added |
|---|---|---|
| 0 | 0 | — |
| 60 | 25 | 5 |
| 100 | 25 | 10 |
| 140 | 35 | 15 |
| 180 | 50 | |
| 220 | 50 | |
| 260 | 50 | |
| 300 | 35 | |
| 340 | 30 | |

After the pressure of the reaction system dropped to 3-4 kg/cm², the polymerization reaction was stopped, and the unreacted vinyl chloride monomer vented. The resulting latex contained about 33% solid. By electromicroscope observation, it was found to consist mainly of polymer particles 1.0 microns in diameter.

EXAMPLE 2

The polymerization recipe and process employed was the same as Example 1, except that the amount of distilled water initially present was changed from 5 ml to 22.5 ml. The ratio of monomer to water at beginning of the polymerization was about 8. The temperature and reaction conditions were the same as Example 1.

The latex formed consisted mainly of polymer particles 0.9 microns in diameter.

EXAMPLE 3

The conditions of Example 1 were again used, except that the initial amount of distilled water was changed from 5 ml to 50 ml. The latex formed consisted mainly of polymer particles of 0.9 microns in diameter. The ratio of monomer to water at the beginning of polymerization was about 4, i.e. 3.86.

EXAMPLE 4

The conditions of Example 1 were again repeated, except in this case the initial amount of distilled water was changed to 100 ml. The ratio of monomer to water at the beginning of polymerization was accordingly about 2.

The latex formed consisted of polymer particles 0.7 microns in diameter.

EXAMPLE 5

The conditions of Example 1 were again repeated, except that the initial amount of distilled water was changed to 200 ml. Thus, the ratio of monomer to water at the beginning of the polymerization was about 1.

The latex formed consisted of polymer particles 0.3–0.4 microns in diameter.

EXAMPLE 6

70 g (solids content 33%, particle size 0.3–0.6 microns) of PVC seed latex, 0.2 g of ammonium persulfate and 20 ml of distilled water were suspended in 1000 g vinyl chloride monomer, and the mixture was polymerized at 45° C. During polymerization, initiator solution (0.6 g ammonium persulfate in 60 ml H₂O) and emulsifier solution (ammonium salt of 3.9 g lauric acid in 1500 ml H₂O) were added. The amount of initiator solution initially added was such so that the ratio of monomer to water at beginning of polymerization was about 15.

Paste resin was isolated from the resulting latex by spray drying. The resulting particles mostly consisted of 1.0–1.6 microns in diameter.

The paste resin 100 parts was mixed with 60 parts bis (2-ethylhexyl) phthalate to yield a plastisol having viscosity 6400 cps at 27° C. (Spindle #4, RPM 60, LVT type, Brookfield viscometer)

EXAMPLE 7

2.5 ml of 28% ammonia water and 0.05 g of ammonium persulfate was dissolved in 22.5 ml distilled water. The solution was then suspended in 190 g vinyl chloride monomer and 10 g vinyl acetate comonomer. The polymerization temperature was 50° C. The ratio of monomer to water at the beginning of the polymerization was about 8. During polymerization, the initiator solution (1.45 g ammonium persulfate in 30 ml H$_2$O) and emulsifier solution (ammonium salt of 1.2 g lauric acid in 295 ml H$_2$O) were added. The latex formed consisted mainly of polymer particles 0.8 microns in diameter.

EXAMPLE 8

2.5 ml of 28% ammonia water and 0.1 g of ammonium persulfate was dissolved in 10 ml distilled water. The solution was then suspended in 190 g vinyl chloride monomer and 10 g lauryl vinyl ether comonomer. The polymerization temperature was 50° C. The ratio of monomer to water at the beginning of polymerization was about 17.

During polymerization, the initiator solution (1.0 g ammonium persulfate in 30 ml H$_2$O) and emulsifier solution (ammonium salt of 1.2 g lauric acid in 295 ml H$_2$O) were added. The latex formed consisted mainly of polymer particles 0.8 microns in diameter.

The data from Examples 1 to 8, as summarized in the following table shows that if the ratio of monomer to water at beginning of the PVC polymerization is greater than 3, preferably greater than 4, polymer particles 0.8 to 1.0 microns or greater in diameter will be obtained.

| Example | Monomer/Water Weight Ratio at the Beginning of Polymerization | Polymer Particle Size, Microns | Monomers |
|---|---|---|---|
| 1 | 29.4 | 1 | Vinyl chloride |
| 2 | 8.23 | 0.9 | Vinyl chloride |
| 3 | 3.86 | 0.9 | Vinyl chloride |
| 4 | 1.97 | 0.7 | Vinyl chloride |
| 5 | 1.01 | 0.3 to 0.4 | Vinyl chloride |
| 6 | 15 | 1 to 1.6 | Vinyl chloride (seeded) |
| 7 | 8.23 | 0.8 | Vinyl chloride/ Vinyl acetate |
| 8 | 16.95 | 0.8 | Vinyl chloride/ lauryl vinyl ether |

Various modifications will suggest themselves to those skilled in the art, such as the use of various conventional initiators and emulsifiers. The present process is suitable for the preparation of copolymers of PVC as well as PVC and the term "PVC polymers" includes both.

That which is sought to be protected is set forth in the following claims:

What is claimed is:

1. An emulsion polymerization process for preparing a polyvinyl chloride latex having a particle size predominantly of 0.8 to 2 microns which comprises:
    (a) forming in a polymerization zone a mixture of a vinyl chloride monomer, water, and a water-soluble initiator so as to initiate the polymerization reaction as a water-in-oil reaction phase; the weight ratio of monomer to water at the beginning of the polymerization being greater than 3,
    (b) feeding into the mixture of (a) above over an extended period an aqueous emulsifier solution so that as the emulsion polymerization reaction proceeds the water-in-oil initial reaction phase changes to an oil-in-water reaction phase, and
    (c) collecting polyvinyl chloride latex after polymerization is complete having particles predominantly 0.8 to 2 microns in diameter.

2. The process of claim 1 wherein the weight ratio of monomer to water at the beginning of the polymerization is greater than 4.

3. The process of claim 1 wherein the polyvinyl chloride particles are about 1 micron in diameter.

4. The process of claim 1 which further comprises venting the unreacted vinyl chloride monomer and collecting the polyvinyl chloride latex after polymerization is complete.

5. The process of claim 4 which further comprises isolating paste resin from the polyvinyl chloride latex.

6. The process of claim 1 wherein said water-soluble initiator is ammonium persulfate.

7. The process of claim 1 wherein polyvinyl chloride seed latex is present at the time of initiating the polymerization, and the resultant latex particles have diameters in excess of 1 micron.

8. The process of claim 1 wherein a second monomer is present during the polymerization.

* * * * *